(12) United States Patent
Ippers et al.

(10) Patent No.: US 8,919,411 B2
(45) Date of Patent: Dec. 30, 2014

(54) SEALING JAW FOR SEALING A PACKAGING MATERIAL USING ULTRASOUND

(75) Inventors: Juergen Ippers, Grefrath (DE); Ulrich Wieduwilt, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/881,409

(22) PCT Filed: Oct. 7, 2011

(86) PCT No.: PCT/EP2011/067541
§ 371 (c)(1),
(2), (4) Date: Apr. 25, 2013

(87) PCT Pub. No.: WO2012/055689
PCT Pub. Date: May 3, 2012

(65) Prior Publication Data
US 2013/0220552 A1  Aug. 29, 2013

(30) Foreign Application Priority Data

Oct. 29, 2010 (DE) .......................... 10 2010 043 089

(51) Int. Cl.
| | |
|---|---|
| *B32B 37/00* | (2006.01) |
| *B29C 65/08* | (2006.01) |
| *B29C 65/00* | (2006.01) |
| *B65B 51/22* | (2006.01) |
| *B65B 51/30* | (2006.01) |
| *B29C 65/74* | (2006.01) |

(52) U.S. Cl.
CPC ............... *B29C 65/08* (2013.01); *B29C 65/087* (2013.01); *B29C 66/1122* (2013.01); *B29C 66/81433* (2013.01); *B29C 66/83513* (2013.01); *B29C 66/849* (2013.01); *B65B 51/225* (2013.01); *B65B 51/306* (2013.01); *B29C 66/81431* (2013.01); *B29C 65/745* (2013.01); *B29C 66/9241* (2013.01)
USPC ..................................... 156/580.2; 156/580.1

(58) Field of Classification Search
USPC ......... 156/73.1, 580.1, 580.2; 228/110.1, 1.1; 264/442, 443, 444, 445; 425/174.2
See application file for complete search history.

(56) References Cited

U.S. PATENT DOCUMENTS

| | | | | |
|---|---|---|---|---|
| 4,572,753 A | * | 2/1986 | Bach ............................. | 156/73.1 |
| 4,681,645 A | * | 7/1987 | Fukushima et al. ......... | 156/73.1 |

(Continued)

FOREIGN PATENT DOCUMENTS

| | | |
|---|---|---|
| DE | 202009007996 | 9/2009 |
| DE | 102009002298 | 10/2010 |
| EP | 1232850 | 8/2002 |
| JP | 7010130 | 1/1995 |

OTHER PUBLICATIONS

International Search Report for Application No. PCT/EP2011/067541 dated Jan. 31, 2012 (English Translation and Original, 6 pages).

*Primary Examiner* — James Sells
(74) *Attorney, Agent, or Firm* — Michael Best & Friedrich LLP

(57) ABSTRACT

A sealing jaw for sealing a packaging material using ultrasound is provided. Said sealing jaw comprises energy directing means (28) which, for sealing purposes, can be brought in contact with an opposite surface (26) via the packaging material and which have a substantially grid-shaped or rhomboidal sealing profile (36).

22 Claims, 4 Drawing Sheets

(56) References Cited

U.S. PATENT DOCUMENTS

| | | | |
|---|---|---|---|
| 4,767,492 A | 8/1988 | Fukusima et al. | |
| 4,975,133 A * | 12/1990 | Gochermann | 156/73.1 |
| 5,525,172 A * | 6/1996 | Cadiou | 156/73.1 |
| 5,562,790 A * | 10/1996 | Ehlert et al. | 156/73.1 |
| 5,830,300 A * | 11/1998 | Suzuki et al. | 156/73.1 |
| 6,190,296 B1 * | 2/2001 | Gnad et al. | 493/8 |
| 6,508,641 B1 * | 1/2003 | Kubik | 425/174.2 |
| 6,986,232 B1 | 1/2006 | Kume et al. | |
| 7,690,548 B2 * | 4/2010 | Mlinar et al. | 228/1.1 |
| 7,793,815 B2 * | 9/2010 | Shimizu et al. | 228/1.1 |
| 2004/0011452 A1 | 1/2004 | Capodieci | |
| 2010/0065187 A1 | 3/2010 | Vaillant et al. | |
| 2012/0073762 A1 | 3/2012 | Ippers et al. | |
| 2012/0111475 A1 | 5/2012 | Ippers et al. | |

* cited by examiner

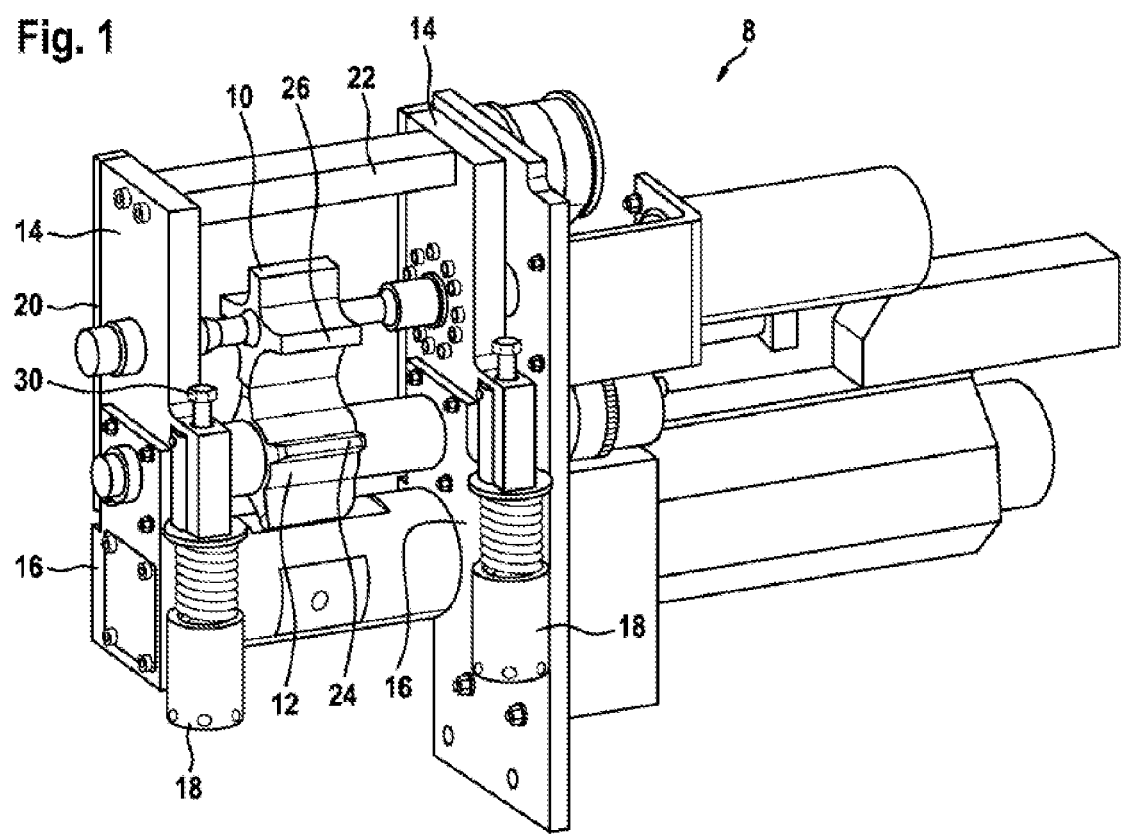

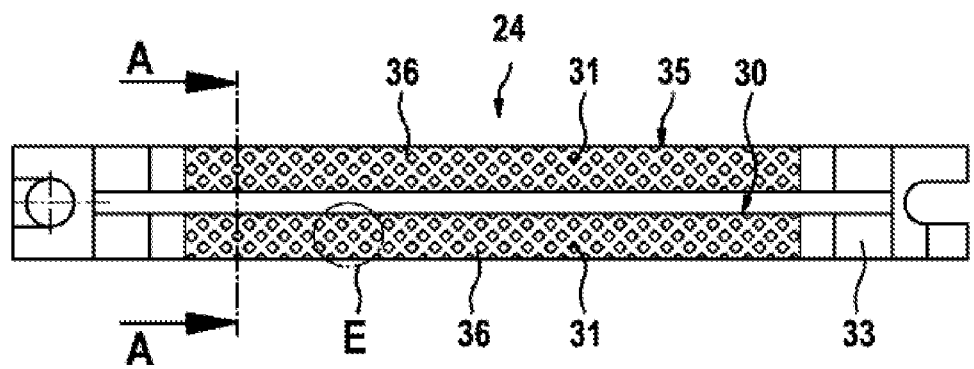
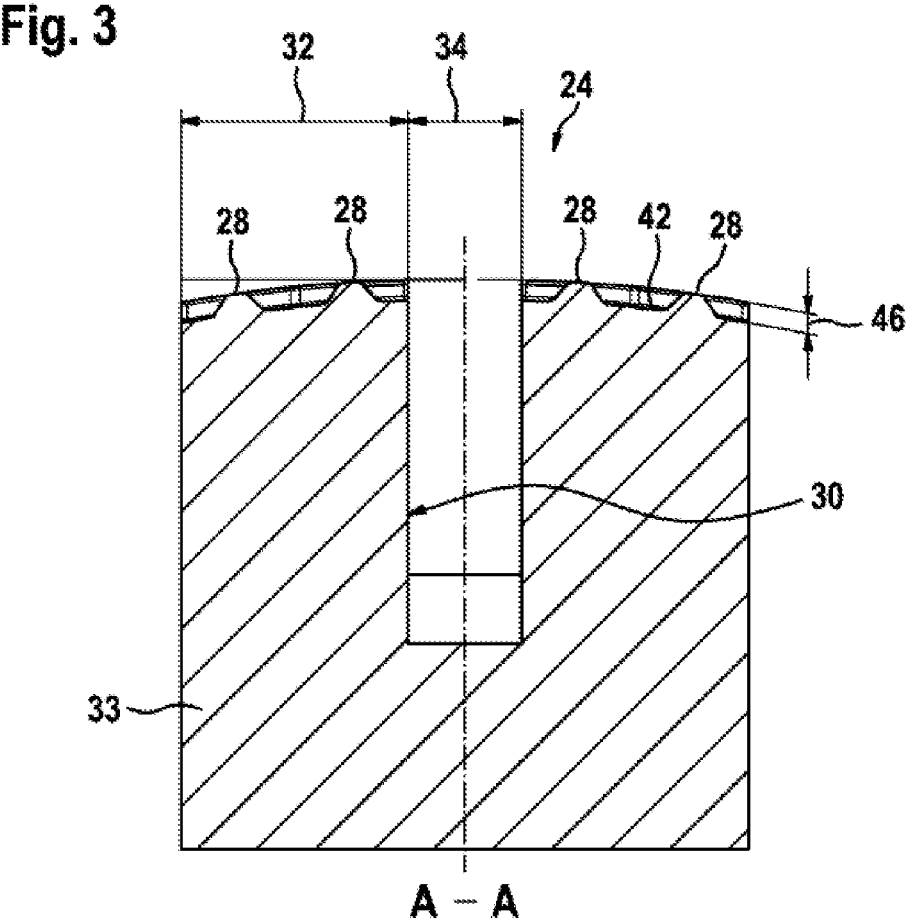

SEALING JAW FOR SEALING A PACKAGING MATERIAL USING ULTRASOUND

BACKGROUND OF THE INVENTION

The invention proceeds from a sealing jaw for sealing a packaging material using. Such a generic apparatus is known, for example, from US 2004/0011452 A1. This describes a transverse sealing device for bar packaging which consists of a rotating sonotrode and a rotating anvil.

SUMMARY OF THE INVENTION

The object underlying the invention is to provide a sealing jaw which improves the sealing quality.

In contrast, the advantage of the sealing jaw for sealing a packaging material using ultrasound is that, on account of the sealing profile selected, a lengthening of the contact time between the sealing tools is achieved, as a result of which the sealing quality is improved. The sealing jaw for sealing a packaging material using ultrasound includes energy directing means which can be moved into contact with a counter surface by means of the packaging material. The energy directing means have a substantially grid-shaped or rhomboidal sealing profile.

In an expedient further development, it is provided that the energy directing means are provided with a radius. As a result, the packaging material is protected. In addition, a high seal seam strength and tightness is able to be achieved.

In an expedient further development, it is provided that the side faces are inclined at an angle in relation to the surface of the sealing profile. As a result, in conjunction with the rounded design of the energy directing means, the fused mass is able to be optimized.

In an expedient further development, it is provided that the side faces merge rounded-off into the base faces. This contributes to a sealing process which protects the packaging material and counteracts any possible adhesion of product residue.

In an expedient further development, it is provided that the grid-shaped or rhomboidal sealing profile consists of several rectangles of substantially identical size. This achieves a particularly uniform force application, as a result of which a sealing seam with a constant high strength is achieved.

In an expedient further development, it is provided that in that the rectangles are arranged in such a manner with regard to a side edge of the sealing jaw that a zigzag-shaped development of the energy directing means is produced. In particular, this allows the contact area to be enlarged, as a result of which the energy input for the sealing is improved.

In an expedient further development, it is provided that that the rectangles are arranged such that a base face of the rectangles is arranged at an angle that differs from zero, preferably 45°, in relation to the side edge of the sealing jaw. This produces a substantially parallel development of the zigzag-shaped energy directing means parallel to the side edge such that a tight seal is produced.

In an expedient further development, it is provided that that the length of the diagonals of the rectangles is selected such that twice the length of the diagonals of the rectangles is less than or equal to a width of the sealing profile. As a result, a high degree of tightness is achieved as the transverse seam sealing is always obtained by two rectangles.

In an expedient further development, it is provided that the sealing profile has two part regions which are separated from each other by a gap. A cutting blade can be incorporated in said gap, whilst the two other part regions of the transverse seam sealing serve for two pouch packages which are to be separated from each other.

BRIEF DESCRIPTION OF THE DRAWINGS

Exemplary embodiments of the apparatus for processing a packaging material using ultrasound are shown in the drawing and are described below, in which, in detail:

FIG. 1 shows a perspective front view of the apparatus for processing a packaging material, FIG. 2 shows the top view on a sealing profile of the anvil, FIG. 3 shows a sectioned representation of the sealing profile according to FIG. 2.

DETAILED DESCRIPTION

Figure 4:
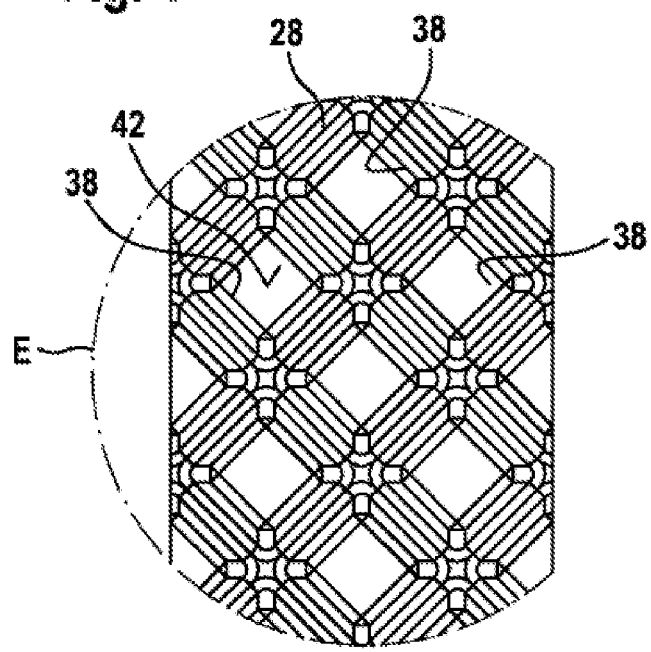
FIG. 4 shows a view of a detail of the sealing profile according to FIG. 2.

In the case of the apparatus according to FIG. 1, a sonotrode 10 is guided rotatably mounted at both ends in each case by an end shield 14. The two end shields 14 for the sonotrode 10 are connected together in a lateral manner at the top end of the apparatus 8 by an upper support means 22, in this case, as an example, realized as a support bar. An anvil 12, which is equally rotatingly mounted, interacts with the sonotrode 10. The anvil 12 is mounted in two end shields 16. The end shield 14 of the sonotrode 10 is connected to the end shield 16 of the anvil 12, arranged in each case below said end shield of the sonotrode, by a coupling means 20. The two end shields 16 of the anvil 12, in their turn, are connected together in a lateral manner by way of a lower support means 24, which is realized, as an example, as a support tube. Force means 18 are arranged in each case on the opposite side of the coupling means 20 with reference to the rotational axes of the sonotrode 10 or the anvil 12, by means of which force means the necessary sealing force can be applied to the sealing face of the sonotrode 10 and of the anvil 12. Adjusting means 30 are provided in each case above the force means 18. As a result the sealing force or sealing gap can be adjusted.

The sonotrode 10 and the anvil 12 have in each case four sealing faces 24, 26. The sealing face 26 of the sonotrode 10 has a smooth, plane surface. The sealing face 24 of the anvil 10 is described in more detail by way of the following figures. According to FIG. 2, the rectangular sealing face 24 of the anvil 10 consists of two rectangular part faces 31 which are separated from each other by an elongated gap 30. The two part faces 31 are in each case provided with special sealing profiles 36. The sealing profiles 36 are essentially realized in the shape of a rectangle or a rhomboid. The base sides of the individual rectangles 38 forming the rectangular sealing profile 36 are aligned inclined at approximately 45° in relation to the side edge 35, as a result of which a lengthening of the length of the seal is achieved.

Figure 5:
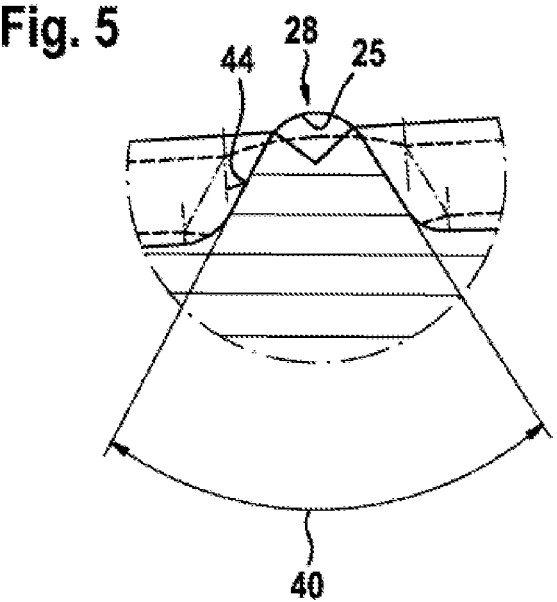
FIG. 5 shows a sectioned representation of a view of a detail of an energy directing means according to FIG. 2.

In the case of the sectional representation according to FIG. 3, it can be seen that energy directing means 28 protrude at a certain height 46 in relation to the base faces 42. The energy directing means 28 are part of a sealing jaw 33. Said energy directing means 28 act during the sealing process as counter faces for the sealing face 26 of the sonotrode 10. It can be seen according to FIG. 5 that the tip of the energy directing means 28 protruding in the direction of the sonotrode 10 is realized with a radius 29. In addition, the energy directing means 28 is inclined by an angle 40 toward the base face 42. The side faces 44 of the energy directing means 28, inclined by the angle 40, merge with a radius, not determined in any more detail, into the base faces 42. The described geometry is shown in an enlarged representation according to FIG. 4. The part face 31 of the sealing profile 36 has a sealing width 32, the gap 30 has a gap width 32.

Figure 6:
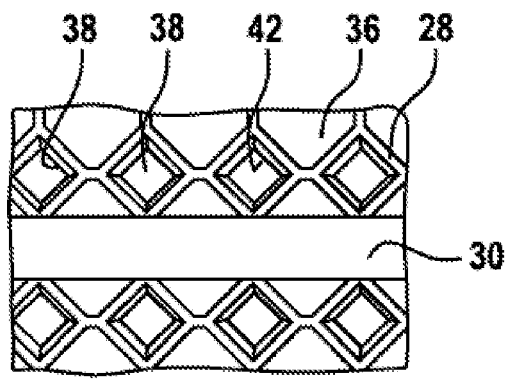
FIG. 6 shows a perspective representation of a first sealing profile.
Figure 7:
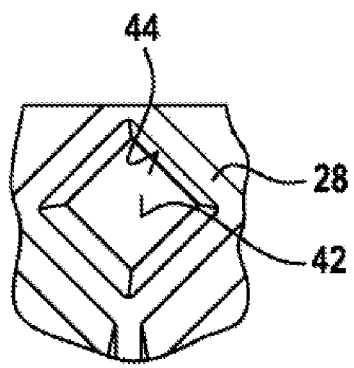
FIG. 7 shows an enlarged view of a detail of the representation according to FIG. 6
Figure 8:
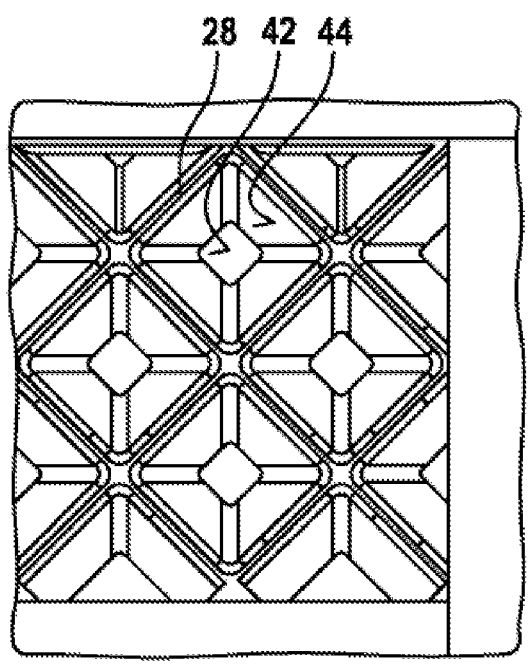
FIG. 8 shows a top view of a second sealing profile with flatter side walls.

Perspective representations in FIGS. 6 and 7 are shown for further clarification of the drawing according to FIGS. 2 to 5. In this connection, the side faces 44 are relatively strongly inclined, approximately by an angle 40 of approximately 60°. In the case of the exemplary embodiment according to FIG. 8, in contrast, the side faces 44 are inclined by an angle 40 of approximately 120°.

The apparatus 8 for processing a packaging material using ultrasound operates as follows. It includes, as the essential element, the sonotrode 10 which acts as an active welding tool against the anvil 12. The system voltage is converted by an electric generator into a high-frequency electric voltage. An ultrasonic transducer (converter), which in its turn converts the electrical energy into high-frequency mechanical oscillations, is connected to the generator. By means of an amplitude matching section (booster), the amplitudes are strengthened or reduced and are transmitted by the converter to the sonotrode 10. The anvil 12 is the passive workpiece. The workpiece to be welded, for example the packaging material, is clamped between the anvil 12 and the sonotrode 10 in order to enable the energy transfer between the sonotrode 10 and the packaging material in this way. The anvil 12 absorbs the ultrasound oscillations of the sonotrode 10. Both the sonotrode 10 and the anvil 12 rotate in opposite directions and are realized quasi as sealing rollers. They have several sealing faces in which a cutting function can also be incorporated for separating off the packaging material. In dependence on the type of packaging material, a sealing gap has to be set with a high level of precision.

The apparatus 8 serves for sealing the transverse seam of a bag. The sealing of the preliminary transverse seam of the following bag is effected by means of the first part face 31, two bags are separated from each other by means of a cutting blade arranged in the gap 30 and the final transverse seam of the preceding bag is sealed by means of the second part face 31.

In the case of ultrasound sealing, energy can only be input during the contact period between the sonotrode 10, the film to be sealed and the energy directing means 28 of the anvil 12. Consequently, it is sensible to optimize the energy input in particular in the case of the described rotating sealing method. This is effected by the described sealing profile 36. The described grid-like structure of the energy directing means 28 enlarges the contact area by running in a zigzag-shaped manner along the side edge 35 of the sealing profile 36 and consequently being realized longer than a parallel, straight-lined execution along the side edge 35 as in the prior art. A uniform distribution of the sealing force is additionally achieved by means of the grid-shaped, waffle-like structure shown. In order to obtain a tight seal, two rectangles 38 are always arranged along the sealing width 32 of a part face 31.

The rounded-off surface with the radius 29 of the energy directing means 28 combined with the side faces 44 inclined by the angle 40 has proved particularly advantageous for the control of the fused mass.

In a preferred manner, the width 32 is in the order of magnitude of 6 mm. The gap width 34 of the gap 30, in a preferred manner, is in the order of magnitude of 3 mm. Consequently, the entire width of the sealing jaw 33 is in the order of magnitude of 15 mm. The tip of the energy directing means 28 protrudes beyond the base face 42 of the rectangles 38 at the height 46 and is approximately in the order of magnitude of 0.5 mm. The radius 29 is approximately within the range of between 0.1 to 1 mm. The angle 40, in a preferred manner, is within a range of between 20° and 120°. The sealing jaw 33 preferably consists of steel. The sealing jaw 33 has corresponding receiving means for fastening means such as bolts or screws, by way of which the sealing jaw 33 can be fastened to the anvil.

What is claimed is:

1. A sealing device for sealing a packaging material using ultrasound, said sealing device including a rotating sonotrode (10) and a rotating anvil (12), wherein the anvil (12) includes a plurality of protruding sealing faces (24) each with energy directing means (28) at ends thereof, the energy directing means (28) configured to move into contact with protruding counter rotating surfaces (26) of the sonotrode (10) for sealing the packaging material, characterized in that the energy directing means (28) have a substantially grid-shaped or rhomboidal sealing profile (36), the energy directing means (28) are provided with a radius (29), the energy directing means (28) have side faces (44) that are inclined at an angle (40) in relation to the surface of the sealing profile (36), and the side faces (44) merge rounded-off into a base face (42).

2. The sealing device as claimed in claim 1, characterized in that the energy directing means (28) protrude in relation to the base face (42), the base face (42) oriented parallel to the surface of the sealing profile (36).

3. The sealing device as claimed in claim 1, characterized in that the grid-shaped or rhomboidal sealing profile (36) consists of several rectangles (38) of substantially identical size.

4. The sealing device as claimed in claim 3, characterized in that the rectangles (38) are arranged in such a manner with regard to a side edge (35) of the sealing device (33) that a zigzag-shaped development of the energy directing means (28) is produced.

5. The sealing device as claimed in claim 3, characterized in that the rectangles (38) are arranged such that a base face of the rectangles (38) is arranged at an angle that differs from zero in relation to a side edge (35) of the sealing device (33).

6. The sealing device as claimed in claim 3, characterized in that a length of diagonals of the rectangles (38) is selected such that twice the length of the diagonals of the rectangles (38) is less than or equal to a width (32) of the sealing profile (36).

7. The sealing device as claimed in claim 1, characterized in that the sealing profile (36) has two part regions (31) which are separated from each other by a gap (30).

8. The sealing device as claimed in claim 5, wherein the rectangles (38) are arranged such that a base face of the rectangles (38) is arranged at an angle of 45° in relation to the side edge (35) of the sealing device (33).

9. A sealing device for sealing a packaging material using ultrasound, said sealing device including a rotating sonotrode (10) and a rotating anvil (12), wherein the anvil (12) includes a plurality of protruding sealing faces (24) with energy directing means (28) at ends thereof, the energy directing means (28) configured to move into contact with protruding counter rotating surfaces (26) of the sonotrode (10) for sealing the packaging material, characterized in that the energy directing means (28) have a substantially grid-shaped sealing profile (36).

10. The sealing device as claimed in claim 9, characterized in that the energy directing means (28) protrude in relation to a base face (42), the base face (42) oriented parallel to the surface of the sealing profile (36).

11. The sealing device as claimed in claim 9, characterized in that the substantially grid-shaped sealing profile (36) consists of several rectangles (38) of substantially identical size.

12. The sealing device as claimed in claim 11, characterized in that the rectangles (38) are arranged in such a manner with regard to a side edge (35) of the sealing device (33) that a zigzag-shaped development of the energy directing means (28) is produced.

13. The sealing device as claimed in claim 11, characterized in that the rectangles (38) are arranged such that a base face of the rectangles (38) is arranged at an angle that differs from zero in relation to a side edge (35) of the sealing device (33).

14. The sealing device as claimed in claim 13, wherein the rectangles (38) are arranged such that a base face of the rectangles (38) is arranged at an angle of 45° in relation to the side edge (35) of the sealing device (33).

15. The sealing device as claimed in claim 11, characterized in that a length of diagonals of the rectangles (38) is selected such that twice the length of the diagonals of the rectangles (38) is less than or equal to a width (32) of the sealing profile (36).

16. The sealing device as claimed in claim 9, characterized in that the sealing profile (36) has two part regions (31) which are separated from each other by a gap (30).

17. The sealing device as claimed in claim 1, wherein the surfaces (26) are flat and smooth.

18. The sealing device as claimed in claim 9, wherein the surfaces (26) are flat and smooth.

19. The sealing device as claimed in claim 1, further comprising end shields (14, 16) that are movably coupled to one another for adjusting a sealing force and a sealing gap between the sonotrode (10) and the anvil (12).

20. The sealing device as claimed in claim 9, further comprising end shields (14, 16) that are movably coupled to one another for adjusting a sealing force and sealing gap between the sonotrode (10) and the anvil (12).

21. The sealing device as claimed in claim 1, further comprising a cutting blade arranged in at least one of the sealing faces (24) to separate two pieces of packaging material.

22. The sealing device as claimed in claim 9, further comprising a cutting blade arranged in at least one of the sealing faces (24) to separate two pieces of packaging material.

* * * * *